3,639,594
PHARMACEUTICAL COMPOSITIONS CONTAINING 6-PHOSPHOGLUCONIC ACID AND SALTS THEREOF
Aurelio Filippo Notarianni and Giuseppe Ghielmetti, Milan, Italy, assignors to SPA—Societa Prodotti Antibiotici S.p.A., Milan, Italy
No Drawing. Filed June 5, 1967, Ser. No. 643,374
Claims priority, application Great Britain, June 6, 1966, 25,026/66
Int. Cl. A61k 27/00
U.S. Cl. 424—224
2 Claims

ABSTRACT OF THE DISCLOSURE

There are described new salts of 6-phosphogluconic acid with metals and simple organic bases and new pharmaceutical compositions containing 6-phosphogluconic acid and/or the new salts thereof, these new pharmaceutical compositions possessing valuable therapeutic properties, especially for the regeneration of the liver.

BACKGROUND OF THE INVENTION

It is known that in order to regenerate the liver cells, the destruction of which has been caused, for example, by viral hepatitis, use can be made of various types of compounds, including hormones, vitamins and anabolites. These compounds are not entirely satisfactory, either because of their poor regenerative action or because of the toxic actions and side effects to which they give rise.

The present invention is concerned with a number of compounds, most of which are not known from the literature, and with pharmaceutical compositions containing the compounds in question, which are useful for the regeneration and reorganisation of liver tissue, the action of said compounds being rapid and not accompanied by toxic manifestations and side effects.

6-phosphogluconic acid, which has the formula:

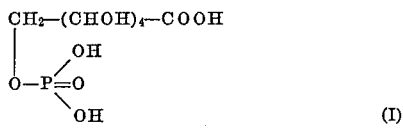

(I)

is known from the literature. This acid is a glycide metabolite which is an intermediate stage in the bio-synthesis of nucleotides, these nucleotides being known to participate in the synthesis of proteins. 6-phosphogluconic acid can be obtained, for example, in the manner described in "Methods of Enzymology," III, published by Academic Press Inc., 1957, page 172 et seq. 6-phosphogluconic acid has only been used in metabolic studies but has not been used for pharmaceutical or therapeutic purposes.

SUMMARY OF THE INVENTION

According to one aspect of the present invention, there are provided pharmaceutical compositions comprising 6-phosphogluconic acid and/or at least one of its non-toxic salts with metals of Groups Ia, IIa and VII of the Periodic Table (Mendeleef) and/or at least one of its non-toxic salts with bases of the general formula:

(II)

wherein $R_1$ is a hydrogen atom or a straight-chain or branched alkyl or hydroxyalkyl radical containing up to 6 carbon atoms and $R_2$ and $R_3$, which may be the same or different, are hydrogen atoms or straight-chain or branched alkyl or hydroxyalkyl radicals containing up to 6 carbon atoms or which, together with the nitrogen atom to which they are attached, form a heterocyclic ring which may contain further hetero atoms, such as nitrogen, oxygen or sulphur, and which may be substituted, and/or at least one of its salts with quaternary ammonium compounds of bases of the above-given general formula; in admixture with either solid pharmaceutical carriers or diluents or with liquid pharmaceutical carriers or diluents suitable for oral administration or with sterile aqueous media for parenteral administration.

According to a further aspect of the present invention, there are provided the calcium, iron, cobalt and magnesium salts of 6-phosphogluconic acid, as well as the salts of 6-phosphogluconic acid with bases of the general Formula II and with quaternary ammonium compounds of said bases.

DETAILED DESCRIPTION OF THE INVENTION

In order to obtain the non-toxic, pharmaceutically-acceptable, water-soluble, inorganic salts of 6-phosphogluconic acid, its barium salt can be reacted in an aqueous medium with equivalent quantities of the sulphate of the desired metal, the barium sulphate formed then filtered off and the aqueous filtrate containing the desired metal salt then either evaporated or mixed with a water-miscible organic solvent, such as an alcohol, ketone, glycol or glycol ether.

According to another method of preparation, the barium salt of 6-phosphogluconic acid is suspended in an aqueous medium, treated with a cationic exchange resin, such as "Amberlite IRC-120" to remove the barium ions, the resin then filtered off to give an aqueous solution of the free 6-phosphogluconic acid which is thereafter reacted with an appropriate inorganic metal compound or with an appropriate base of general Formula II. When the salts produced are water-insoluble, they can be isolated by filtration and when they are water-soluble, they can be isolated by evaporation of the filtrate or by the addition of a water-soluble organic solvent which precipitates them out of solution.

As examples of salts of 6-phosphogluconic acid, there may be mentioned the sodium, potassium, calcium, iron, cobalt and magnesium salts. As examples of salts with the non-toxic organic bases of general Formula II, there may be mentioned those with alkanolamines (e.g. ethanolamine and triethanolamine), alkylamines (e.g. trimethylamine, ethylamine, diethylamine, triethylamine and n-butylamine), quaternary bases (e.g. choline) and heterocyclic bases (e.g. morpholine, piperazine and piperidine). All these salts have the above-mentioned regenerative effect on the liver.

In order to demonstrate the regenerative and reorganisational activity of the compounds in question on the liver, a series of experiments have been carried out on albino rats with an approximate weight of 200 g. The right and middle lobes of the liver, i.e. about 60% of the liver, were removed from the rats while under light anaesthesia. Three groups of rats, each containing 8 animals, were kept for control purposes.

For the purpose of comparison, 3 groups of rats, each containing 8 animals, were treated intraperitoneally with a different compound, namely, glucose-1-phosphate, at a rate of 500 mg. per kg., divided into 2 daily administrations, and 3 other groups, each containing 8 animals, were treated with the same method of administration with glucose-6-phosphate at a rate of 500 mg. per kg. per day, in the form of a 20% by weight solution in distilled water. The control groups were treated with equimolecular quantities of the respective glucides and phosphate ions. Finally, 3 further groups, each containing 8 animals, were treated with trisodium 6-phosphogluconate at a rate of 150 mg. per kg. per day.

The animals of the various groups were sacrificed at intervals of 48, 96 and 192 hours after the original surgical intervention. The increase of weight due to regeneration was determined in the animals by means of Drabkin's formula, which is sufficient indication of the nature of the regeneration phenomenon or of its possible variations.

The results obtained by the experiments are set out in the following table:

TABLE

| Number of rats | Treatment | Hours after surgical intervention | Percentage increase in weight (ref. to that removed) |
|---|---|---|---|
| 8 | Control | 48 | 54.53 |
| 8 | Glucose-1-phosphate | 48 | 66.23 |
| 8 | Glucose-6-phosphate | 48 | 64.61 |
| 8 | Trisodium 6-phosphogluconate | 48 | 73.89 |
| 8 | Control | 96 | 74.72 |
| 8 | Glucose-1-phosphate | 96 | 87.19 |
| 8 | Glucose-6-phosphate | 96 | 84.80 |
| 8 | Trisodium 6-phosphogluconate | 96 | 108.10 |
| 8 | Control | 192 | 87.94 |
| 8 | Glucose-1-phosphate | 192 | 106.93 |
| 8 | Glucose-6-phosphate | 192 | 89.12 |
| 8 | Trisodium 6-phosphogluconate | 192 | 120.15 |

The following examples are given for the purpose of illustrating the present invention:

Example 1

Trisodium 6-phosphogluconate.—Barium 6-phosphogluconate is slurried in water, with vigorous stirring and an aqueous solution of an equimolar amount of sodium sulphate added thereto, with stirring. The barium sulphate thus formed is filtered off with suction and acetone added to the filtrate in order to precipitate out the trisodium 6-phosphogluconate formed. This trisodium salt is obtained in the form of a white crystalline powder which is soluble in water but insoluble in common organic solvents.

Analysis.—$C_6H_{10}O_{10}PNa_3$ (M.W. 342.1). Calc. (percent): P, 9.06; Na, 20.16. Found (percent): P, 9.11; Na, 20.13.

The following compounds are prepared in a similar manner:

Tripotassium 6-phosphogluconate.—This is a white crystalline powder which is soluble in water but insoluble in common organic solvents.

Analysis.—$C_6H_{10}O_{10}PK_3$ (M.W. 390.4). Calc. (percent): P, 7.94; K, 30.04. Found (percent): P, 7.90; K, 30.09.

Calcium 6-phosphogluconate.—This is a white powder which is soluble in water but insoluble in common organic solvent.

Analysis.—$C_6H_{11}O_{10}PCa$ (M.W. 314.2). Calc. (percent): P, 9.86; Ca, 12.75 Found (percent): 9.93; Ca, 12.70.

Magnesium 6-phosphogluconate.—This is a white microcrystalline powder which is soluble in water but insoluble in common organic solvents.

Analysis.—$C_6H_{11}O_{10}PMg$ (M.W. 298.4). Calc.: (percent): P, 10.38; Mg, 8.15. Found (percent): P, 10.97; Mg, 7.93.

Example 2

Ferrous 6-phosphogluconate.—Barium 6-phosphogluconate is slurried in water with sufficient "Amberlite IRC-120" to remove the barium. The exchange resin is then filtered off and an equimolar amount of a freshly prepared aqueous suspension of ferrous hydroxide added to the filtrate. Since ferrous 6-phosphogluconate is slightly soluble in water, methanol is added to complete the precipitation of the desired salt which is isolated and dried. It is obtained in the form of a powder which is slightly soluble in water but insoluble in common organic solvents.

Analysis.—$C_6H_{11}O_{10}PFe$ (M.W. 329.9). Calc.: (percent): P, 9.39; Fe, 16.94. Found (percent): P, 9.47; Fe, 16.37.

The following compounds are prepared in a similar manner:

Neutral ferrous 6-phosphogluconate.—This is a white powder which is insoluble in water and in common organic solvents.

Analysis.—$C_{12}H_{20}O_{20}P_2Fe_3$ (M.W. 713.8). Calc. (percent): P, 8.69; Fe, 23.5. Found (percent): P, 8.73; Fe, 24.0.

Ferric 6-phosphogluconate.—This is a microcrystalline powder which is insoluble in water and in common organic solvents.

Analysis.—$C_6H_{10}O_{11}PFe$ (M.W. 328.9). Calc. (percent): P, 9.43; Fe, 16.97. Found (percent): P, 9.72; Fe, 16.83.

Cobalt 6-phosphogluconate.—This is a pinkish white powder which is slightly soluble in water but insoluble in common organic solvents.

Analysis.—$C_6H_{11}O_{11}PCo$ (M.W. 333.08). Calc. (percent): P, 9.31; Co, 17.69. Found (percent): P, 10.05; Co, 16.83.

Example 3

Mono-(ethanolamine) 6-phosphogluconate.—An aqueous solution of 6-phosphogluconic acid, prepared in the manner described in Example 2, is mixed with an equimolar amount of ethanolamine. The solution is then carefully evaporated to dryness in a vacuum to give the desired salt which is obtained in the form of a white powder which is soluble in water, methanol, ethanol and aqueous solvents but is insoluble in slightly polar solvents.

Analysis.—$C_6H_{13}O_{10}P \cdot HOCH_2CH_2NH_2$ (M.W. 337.2). Calc. (percent): P, 9.18; N, 4.15. Found (percent): P, 8.93; N, 4.93.

The following compounds are prepared in a similar manner:

Di-(ethanolamine) 6-phosphogluconate.—This is a white powder which is soluble in water, methanol, ethanol and aqueous solvents but is insoluble in slightly polar solvents.

Anal.—$C_6H_{13}O_{10}P \cdot 2[HOCH_2CH_2NH_2]$ (M.W. 398.4). Calc. (percent): P, 7.78; N, 7.03. Found (percent): P. 8.03; N, 7.91.

Di-(triethanolamine) 6-phosphogluconate.—This is a white powder which is soluble in water, methanol, ethanol and aqueous solvents but is insoluble in slightly polar solvents.

Anal.—$C_6H_{13}O_{10}P \cdot 2[N(CH_2CH_2OH)_3]$ (M.W. 574.5). Calc. (percent): P, 5.39; N, 4.88. Found (percent): P, 5.00; N, 4.91.

Mono-(trimethylamine) 6-phosphogluconate.—This is a white microcrystalline powder which is soluble in water, methanol and ethanol but insoluble in other common organic solvents.

Analysis.—$C_6H_{13}O_{10}P \cdot N(CH_3)_3$ (M.W. 335.21). Calc. (percent): P, 9.24; N, 4.18. Found (percent): P, 10.08; N, 4.00.

Di-(trimethylamine) 6-phosphogluconate.—This is a white powder which is soluble in water, methanol and ethanol but insoluble in other common organic solvents.

Anal.—$C_6H_{13}O_{10}P \cdot 2[N(CH_3)_3]$ (M.W. 394.3). Calc. (percent): P, 7.86; N, 7.10. Found (percent): P, 8.01; N, 7.12.

Mono-(ethylamine) 6-phosphogluconate.—This is a white powder which is soluble in water, methanol and ethanol but insoluble in other common organic solvents.

Analysis.—$C_6H_{13}O_{10}P \cdot H_2NC_2H_5$ (M.W. 321.2). Calc. (percent): P, 9.64; N, 4.36. Found (percent): P, 9.01; N, 5.01.

Di-(ethylamine) 6-phosphogluconate.—This is a white powder which is soluble in water, methanol and ethanol but insoluble in other common organic solvents.

Anal.—$C_6H_{13}O_{10}P2[H_2N \cdot C_2H_5]$ (M.W. 366.3). Calc. (percent): P, 8.46; N, 7.64. Found (percent): P, 8.00; N, 7.91.

Mono-(diethylamine) 6-phosphogluconate.—This is a white powder which is soluble in water, methanol and ethanol but insoluble in other common organic solvents.

Analysis.—$C_6H_{13}O_{10}P \cdot HN(C_2H_5)_2$ (M.W. 349.2). Calc. (percent): P, 8.87; N, 4.01. Found (percent): P, 9.03; N, 4.27.

Di-(diethylamine) 6-phosphogluconate.—This is a white powder which is soluble in water, methanol and ethanol but is insoluble in other common organic solvents.

Analysis.—$C_6H_{13}O_{10}P \cdot 2[NH(C_2H_5)_2]$ (M.W. 422.4). Calc. (percent): P, 7.34; N, 6.63. Found (percent): P, 7.91; N, 5.87.

Mono-(triethylamine) 6-phosphogluconate.—This is a white powder which is soluble in water, methanol and ethanol but is insoluble in other common organic solvents.

Analysis.—$C_6H_{13}O_{10}P \cdot N(C_2H_5)_3$ (M.W. 377.3). Calc. (percent): P, 8.21; N, 3.71. Found (percent): P, 8.42; N, 3.68.

Di-(triethylamine) 6-phosphogluconate.—This is a white powder which is soluble in water, methanol and ethanol but insoluble in other common organic solvents.

Analysis.—$C_6H_{13}O_{10}P \cdot 2[N(C_2H_5)_3]$ (M.W. 478.5). Calc. (percent): P, 6.48; N, 5.85. Found (percent): P, 6.37; N, 5.97.

Di-(n-butylamine) N-phosphogluconate.—This is a white powder which is soluble in water, methanol and ethanol but insoluble in other common organic solvents.

Analysis.—$C_6H_{13}O_{10}P \cdot 2[C_4H_9 \cdot NH_2]$ (M.W. 422.4). Calc. (percent): P, 7.34; N, 6.63. Found (percent): P, 7.31; N, 6.70.

Di-(choline) 6-phosphogluconate.—This is a white powder which is soluble in water, methanol and ethanol but insoluble in other common organic solvents.

Analysis.—$C_6H_{11}O_{10}P \cdot 2[C_5H_{14}NO]$ (M.W. 482.4). Calc. (percent): P, 6.43; N, 5.81. Found (percent): P, 6.52; N, 5.78.

Di-(morpholine) 6-phosphogluconate.—This is a white powder which is soluble in water, methanol and ethanol but insoluble in other common organic solvents.

Analysis.—$C_6H_{13}O_{10}P \cdot 2[C_4H_9NO]$ (M.W. 450.3). Calc. (percent): P, 6.88; N, 6.22. Found (percent): P, 6.92; N, 6.19.

Di-(piperidine) 6-phosphogluconate.—This is a white powder which is soluble in water, methanol and ethanol but insoluble in other common organic solvents.

Analysis.—$C_6H_{13}O_{10}P \cdot 2[C_5H_{11}N]$ (M.W. 446.4). Calc. (percent): P, 6.95; N, 6.28. Found (percent): P, 7.03; N, 6.13.

Mono-(piperazine) 6-phosphogluconate.—This is a white powder which is soluble in water, methanol and ethanol but insoluble in other common organic solvents.

Analysis.—$C_6H_{13}O_{10} \cdot C_4H_{10}N_2$ (M.W. 362.2). Calc. (percent): P, 8.55; N, 7.73. Found (percent): P, 8.61; N, 7.81.

The present invention also includes within its scope pharmaceutical compositions containing at least one compound selected from 6-phosphogluconic acid, its metal salts (as hereinbefore defined) and its salts with bases of general Formula II, in admixture with a solid or liquid pharmaceutical carrier or diluent. These pharmaceutical compositions can be administered orally, rectally or by intravenous or intramuscular injection.

Solid compositions for oral administration include compressed tablets, pills, dragees, dispersible powders and granules. In such solid compositions, at least one active compound according to the present invention is admixed with at least one inert diluent, such as glucose, invert sugar, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluent commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing at least one of the active substances according to the present invention, with or without the addition of diluents or excipients.

Preparations according to the present invention for parenteral administration include sterile aqueous or non-aqueous solutions, suspensions or emulsions. Examples of non-aqueous solvents or suspensing media include propylene glycol, polyethylene glycol, vegetable oils, such as olive oil, and injectable organic esters, such as ethyl oleate. These compositions may also contain adjuvants, such as glucose, invert sugar or wetting, emulsifying and dispersing agents. They may be sterilised, for example, by filtration through bacteria-retaining filters, by incorporating into the compositions of sterilising agents, by irradiation or by heating. They may also be produced in the form of sterile solid compositions, which can be dissolved in sterile water or some other sterile injectable medium immediately before use.

The percentage of active ingredient on the compositions of the present invention may be varied, it being necessary that it should constitute a proportion such that a suitable dosage for the desired therapeutic effect shall be obtained.

In general, the solid pharmaceutical compositions according to the present invention can be made up into dosage units containing 50–250 mg. of active ingredient. In the case of liquid phamaceutical compositions for oral administration, these preferably contain 1–90% of active ingredient, preferably about 20% of an active ingredient, a solubilising agent being added, if necessary, when the active ingredient is not very soluble in the liquid medium.

The following examples illustrate pharmaceutical compositions according to the present invention:

Example 4

250 mg. tablets are prepared containing:

| | Mg. |
|---|---|
| Trisodium 6-phosphogluconate | 100 |
| Starch | 145 |
| Magnesium stearate | 5 |

Example 5

200 mg. tablets are prepared containing

| | Mg. |
|---|---|
| Ferric 6-phosphogluconate | 100 |
| Starch | 100 |
| Lactose | 45 |
| Magnesium stearate | 5 |

In the specific case of administration of 6-phosphogluconic acid or of its salts (as hereinabove defined) by a parenteral route, for example, for intravenous or intramuscular injection, the composition is in the form of a sterile aqueous solution which can be administered either by drip feed or by single injections. Such solutions preferably contain up to about 20% of active material. Thus a single injection may contain 100–500 mg. of active material and a solution for drip feed administration may contain 5 g. of active materials per 250 ml. of solution. The preferred active materials for this purpose are 6-phosphogluconic acid per se and its trisodium and tripotassium salts although it is to be understood that the other salts described hereinbefore can also be used. Furthermore, the sterile aqueous solutions for parenteral administration can also contain a sugar, such as glucose, laevulose or invert sugar, preferably in an amount of 1–20% by weight, referred to the composition as a whole.

We claim:
1. A pharmaceutical in the form of a tablet containing 50 to 250 mg. of a member selected from a group consisting of 6-phosphogluconic acid, the non-toxic salts of

6-phosphogluconic acid with a metal selected from the group consisting of sodium, potassium, calcium, magnesium, iron and cobalt, the non-toxic salts of 6-phosphogluconic acid with a base of the formula:

wherein $R_1$ is a member selected from the group consisting of hydrogen and straight-chained and branched alkyl and hydroxyalkyl radical containing up to 6 carbon atoms and $R_2$ and $R_3$ are members selected from the group consisting of hydrogen and straight-chained and branched alkyl and hydroxyalkyl radicals containing up to 6 carbon atoms, and radicals in which $R_2$ and $R_3$, together with the nitrogen atom to which they are attached, from a morpholine, piperidine or piperizine ring and the choline salt of 6-phosphogluconic acid in admixture with a solid pharmaceutical carrier.

2. A sterile aqueous pharmaceutical solution containing 100–500 mgs. of a member selected from a group consisting of 6-phosphogluconic acid, the non-toxic salts of 6-phosphogluconic acid with a metal selected from the group consisting of sodium, potassium, calcium, magnesium, iron and cobalt, the non-toxic salts of 6-phosphogluconic acid with a base of the formula:

wherein $R_1$ is a member selected from the group consisting of hydrogen and straight-chained and branched alkyl and hydroxyalkyl radical containing up to 6 carbon atoms and $R_2$ and $R_3$ are members selected from the group consisting of hydrogen and straight-chained and branched alkyl and hydroxyalkyl radicals containing up to 6 carbon atoms, and radicals in which $R_2$ and $R_3$, together with the nitrogen atom to which they are attached, form a morpholine, piperidine, or piperizine ring and the choline salt of 6-phosphogluconic acid and 1–20% by weight of a sugar.

References Cited

Horecker: Methods of Enzymology, III, Academic Press Inc., 1957, pp. 172–174.

ALBERT T. MEYERS, Primary Examiner

D. M. STEPHENS, Assistant Examiner